Figure 1:
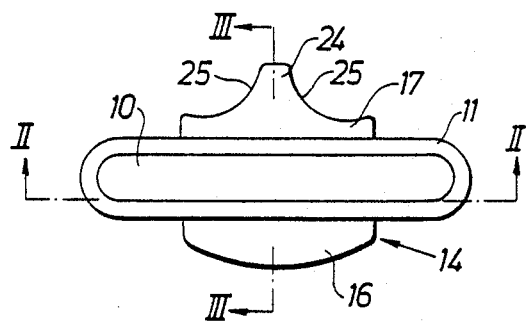

United States Patent [19]

Mattsson

[11] Patent Number: 4,546,668
[45] Date of Patent: Oct. 15, 1985

[54] POSITION ADJUSTMENT DEVICE

[75] Inventor: Lars B. E. Mattsson, Sävar, Sweden

[73] Assignee: Nystrom Nordpatent Aktiebolag, Umea, Sweden

[21] Appl. No.: 484,261

[22] Filed: Apr. 12, 1983

[30] Foreign Application Priority Data

Apr. 13, 1982 [SE] Sweden .................. 8202317

[51] Int. Cl.⁴ .................. G05G 5/06; F16H 1/04; F16M 11/04
[52] U.S. Cl. .................. 74/531; 74/422; 248/408
[58] Field of Search .............. 74/531, 527, 422, 89.17, 74/89; 248/297.3, 408, 118, 118.3; 297/410, 391; 108/146

[56] References Cited

U.S. PATENT DOCUMENTS

| | | | |
|---|---|---|---|
| 359,340 | 3/1887 | Zaccone | 108/146 |
| 421,146 | 2/1890 | Schmidt et al. | 248/297.3 |
| 899,009 | 9/1908 | Evans | 74/84.17 |
| 955,546 | 4/1910 | Proctor | 248/408 |
| 1,041,701 | 11/1911 | Thornley | 248/408 X |
| 1,569,708 | 1/1926 | Burns et al. | 248/297.3 X |
| 2,405,013 | 11/1942 | Campbell | 248/408 |
| 2,408,365 | 1/1944 | Biehl et al. | 74/413 |
| 2,429,696 | 10/1947 | Merkt | 74/422 |
| 2,540,738 | 2/1951 | Kaplowitz | 74/89.17 X |
| 2,618,041 | 11/1952 | Nelson | 297/410 X |
| 2,920,501 | 1/1960 | Couch | 74/422 X |
| 3,249,388 | 5/1966 | Jennings | 297/437 |
| 3,336,814 | 8/1964 | Holzer | 74/461 |
| 3,792,624 | 2/1974 | Pitner | 74/422 |
| 3,826,156 | 7/1974 | Dornaus | 74/531 X |
| 4,038,508 | 7/1977 | Mapelsden | 74/531 X |

FOREIGN PATENT DOCUMENTS

| | | | |
|---|---|---|---|
| 309939 | 12/1972 | Austria . | |
| 2053665 | 5/1972 | Fed. Rep. of Germany . | |
| 2537999 | 3/1977 | Fed. Rep. of Germany . | |
| 2728008 | 1/1978 | Fed. Rep. of Germany . | |
| 379013 | 9/1975 | Sweden . | |
| 469468 | 4/1969 | Switzerland . | |
| 220742 | 8/1924 | United Kingdom | 74/422 |
| 833739 | 4/1960 | United Kingdom | 74/527 |

*Primary Examiner*—Kenneth J. Dorner
*Assistant Examiner*—Rodney M. Lindsey
*Attorney, Agent, or Firm*—Fleit, Jacobson, Cohn & Price

[57] ABSTRACT

A device for stepwise adjustment of the relative positions of two mutually displaceable members (10, 11) comprises a gear rack (13) formed in one (10) of said members, a pin gear (14) with two pin teeth (15) which is mounted for rotation and limited transversal displacement thereof in the other member (11), and means (23) for spring-biasing the pin gear (14) towards a locking position in which the two pin teeth (15) are located in meshing engagement in adjacent tooth gaps of the gear rack (13). Said spring-biasing means (23) are placed in front of the pin teeth (15), on the opposite side thereof with respect to the gear rack (13), and they include a spring-force applying member (23A) which bears resiliently against both pin teeth (15) when the pin gear (14) is in its locking position.

7 Claims, 5 Drawing Figures

POSITION ADJUSTMENT DEVICE

The present invention relates to a device for stepwise adjustment of the relative positions of two mutually displaceable members. More particularly, the invention relates to such a device of the kind comprising a gear rack formed in one of said members, a pin gear adapted to cooperate with said gear rack and having only two pin teeth, said pin gear being mounted in the other member in a manner so as to permit rotation thereof and limited displacement thereof in a direction perpendicular to its rotary axis and to the longitudinal direction of the gear rack, and means for spring-biasing the pin gear towards a locking position in which it may hold said two members against relative displacement by having its two pin teeth arranged in simultaneous engagement, each in one of two adjacent tooth gaps of the gear rack.

In devices of said kind, the pin gear not only forms a locking means which is adapted to lock the two mutually displaceable members against relative displacement, but it also forms an adjustment means by which the relative positions of said members may be adjusted in steps. Thus, the fact is that when the pin gear is rotated, the two members will be displaced relatively to each other by a distance corresponding to the tooth pitch of the gear rack for each rotation of the pin gear through an angle of 180°.

A common feature of prior art devices of the above kind is that the spring forces produced by the spring-biasing means have been applied on cylindrical surfaces of the pin gear located concentrically to the rotary axis of the pin gear. This fact has made it necessary to apply comparatively large spring forces on the pin gear in order to secure a reliable locking function.

The invention has for its purpose to provide an improved device of the kind initially specified, wherein the magnitude of the total spring force applied on the pin gear may be reduced substantially without adversely affecting the desired locking function.

In accordance with the invention, for this purpose, there is provided a device of said kind which is characterized primarily in that said spring-biasing means are placed in front of the pin teeth, on the opposite side thereof with respect to the gear rack, and in that said means include a spring-force applying member which is adapted to bear resiliently against both pin teeth when the pin gear is in its locking position.

By applying the spring force on the pin teeth, which are located eccentrical to the rotary axis of the pin gear, it is possible to reduce the magnitude of the required spring force for safely holding the pin gear in its locking position to about half the spring force required for said purpose in the prior art devices. Additionally, it is also possible to center the spring force, in an axial direction of the pin gear, to a position located in front of the gear rack while utilizing a single spring member. In devices belonging to the prior art, it has not been possible to center the spring force correspondingly, unless at least two different spring members are used.

In a first embodiment of the invention, the spring-biasing means are mounted in a recess provided in said one member, in front of the gear rack, said spring-force applying member extending substantially parallel to the gear rack along at least approximately the whole length thereof. However, this embodiment is intended to be used only in such cases where the maximum length of relative movement between the two mutually displaceable members is comparatively short.

If it is desirable to permit relative movement between said two members for longer distances, according to a second embodiment of the invention, the spring-biasing means may preferably be mounted in a pocket provided in said other member, in front of the pin teeth.

The spring-force applying member may simply consist of an at least approximately straight portion of a leaf spring which forms said spring-biasing means. However, the spring-force applying member may alternatively consist of a separate stiff member which is adapted to transmit spring forces to the pin teeth from one or more separate springs acting on said member.

The reduction of the necessary spring force to be applied on the pin gear, obtained through the invention, results in that the pin gear may easily be moved from its locking position to a release position, in which both pin teeth are out of engagement with the gear rack. In order to facilitate such a movement of the pin gear from its locking position to a release position, the pin gear may suitably be provided with a manual operating means having a tongue-shaped gripping portion with two opposite gripping surfaces which are located each on one side of a plane through the axes of the two pin teeth.

The invention may be utilized within various technical fields. For instance, the device according to the invention may be utilized in connection with vehicle chairs and other chairs to permit a stepwise adjustment of the relative positions of two mutually displaceable members.

Figure 2:
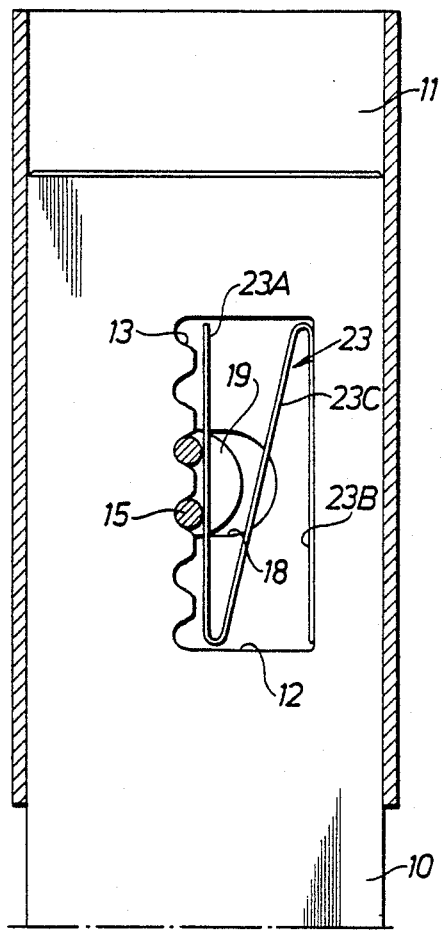
Figure 3:
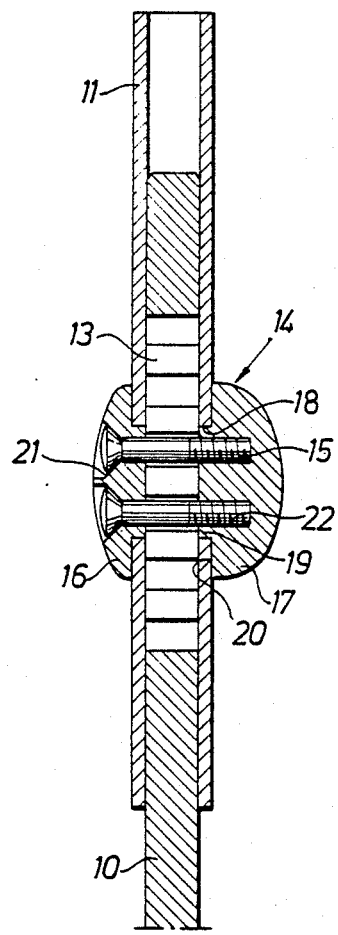
Figure 4:
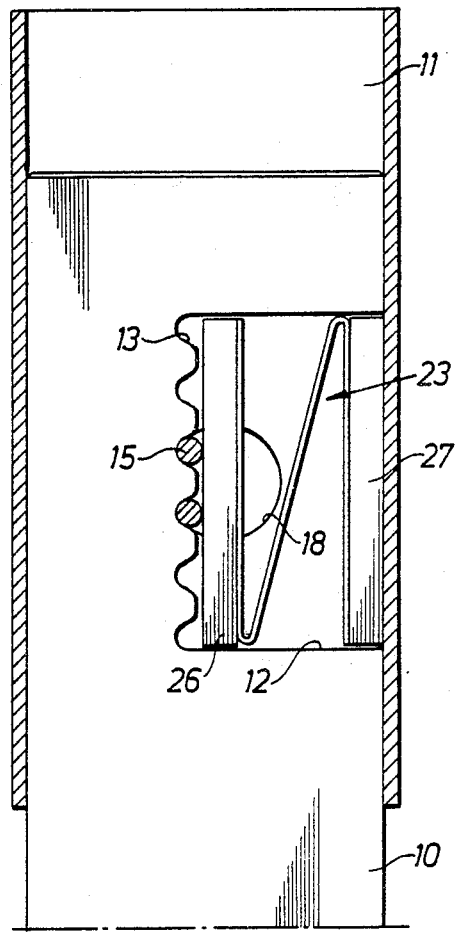
Figure 5:
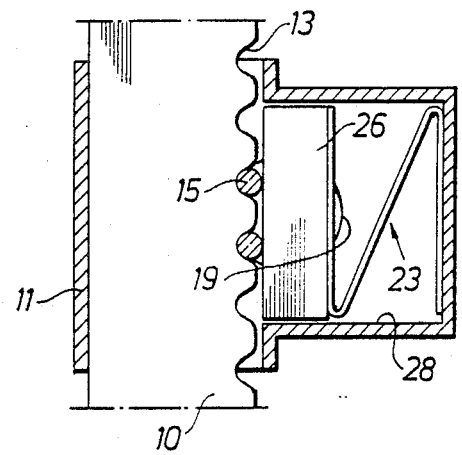

Below the invention will be described in further detail, reference being had to the accompanying drawings, in which:

FIG. 1 shows a top plan view of two members which are arranged for relative displacement in a vertical direction and which are provided with a device for stepwise adjustment of their relative positions, formed in accordance with a first embodiment of the invention, selected by way of example, FIG. 2 shows a first elevation, in section taken along line II—II in FIG. 1, FIG. 3 shows a second elevational view, seen in a direction perpendicular to that of FIG. 2, and in section taken along line III—III in FIG. 1, FIG. 4 shows a view corresponding to FIG. 2, illustrating a modification of the adjustment device, and FIG. 5 shows a view corresponding to FIG. 2, illustrating an adjustment device according to a second embodiment of the invention, selected by way of example.

In FIGS. 1 to 3, reference numeral 10 designates a flat rod which is arranged in an upright position and which may serve, for instance, as a stationary support for a vertically adjustable arm rest or head rest (not shown) of a vehicle chair or other chair. Reference numeral 11 designates a flat sleeve which is mounted vertically displaceable in sliding fit on rod 10. The upper end of sleeve 11 may serve as a mounting for said arm rest or back rest, respectively.

By means of an adjustment device according to a first embodiment of the invention, sleeve 11 may be moved in steps in a vertical direction along rod 10 and locked releasably in adjusted position on said rod. Said adjustment device comprises a gear rack 13 formed in a vertical wall of a generally rectangular through-opening 12 in rod 10, and a pin gear, generally designated 14, which cooperates with said gear rack and is provided with two pin teeth 15. Said pin gear 14 is mounted in sleeve 11 so as to permit rotation thereof as well as limited horizontal displacement in a direction perpendicular to its rotary axis.

The pin gear 14 has a body formed by two opposite portions 16 and 17 having inner cylindrical portions 19 which project into oblong holes 18 in the two opposite broad walls of sleeve 11 to serve as journals for pin gear 14. Adjacent to said cylindrical portion 19, each body portion 16 and 17, respectively, has a radially projecting shoulder 20 by which it rests against the outer surface of the corresponding wall of sleeve 11. As can be seen from FIG. 3, the pin teeth 15 are formed by threaded bolts which are provided with enlarged heads and serve to connect the two body portions 16 and 17 to each other. The heads of bolts 15 are received in countersunk bores 21 in body portion 16 and the threaded end portions of their shanks are threaded into bores 22 in body portion 17.

Reference numeral 23 designates a leaf spring placed in opening 12 in rod 10 and having two substantially straight vertically extending outer portions 23A and 23B, and a diagonally extending middle portion 23C which interconnects the two outer portions.

When the pin gear 14 is in the position shown in FIGS. 1-3, which means that the two pin teeth 15 are located in engagement each in one of two adjacent tooth gaps of gear rack 13, portion 23A of spring 23 bears against both pin teeth 15 at the sides of said teeth turned away from gear rack 13. Sleeve 11 is then held against displacement on rod 10, as spring 23 will hold pin gear 14 in firm locking engagement with gear rack 13.

The adjustment device above described permits an adjustment of the position of sleeve 11 in two different ways. On the one hand, sleeve 11 may be vertically displaced on rod 10 through manual rotation of pin gear 14. In this case, sleeve 11 will be displaced by a distance corresponding to the tooth pitch of gear rack 13 for each rotation of pin gear 14 by half a revolution. On the other hand, pin gear 14 may be completely disengaged from gear rack 13 through manual horizontal displacement thereof in a direction to the right according to FIG. 2. When, upon such a displacement of pin gear 14, both pin teeth 15 have been brought out of engagement with gear rack 13, sleeve 11 may rapidly be moved to another position along rod 10 while manually maintaining pin gear 14 in its release position. Sleeve 11 may then again be locked to rod 10 through the action of spring 23 which will cause pin gear 14 to return to locking engagement with gear rack 13 as soon as the pin gear is released and thus no longer subjected to any outer manual force.

Body portion 17 of pin gear 14 is intended to form the required manual operating means for the pin gear. For this object, the outermost part of body portion 17 is formed as a tongue-shaped gripping portion 24 which is provided with two opposite gripping surfaces 25 located each on one side of a plane through the axes of the two pin teeth 15.

As compared to the prior art, the adjustment device above described offers at least the following important advantages. Since spring 23 acts directly on the two pin teeth, instead of acting on a surface concentrical with the rotary axis of the pin gear, the required spring force for maintaining pin gear 14 in its illustrated locking position may be substantially reduced. Additionally, by placing spring 23 in recess 12 in rod 10 provided in front of gear rack 13, it is possible to obtain a reduction of the axial length of pin gear 14, and to design sleeve 11 and spring 23 in a favourable and simple fashion, and to ensure that the spring will be maintained in place without using any special means for holding it in its intended position.

FIG. 4 illustrates a slightly modified embodiment. Thus, in said figure, recess 12 extends right up to the edge of rod 10. Additionally, spring 23 is placed between a separate spring-force applying member, which bears against the pin teeth 15 and is formed by a rigid bar 26, and a separate spring support, which rests against an inner wall surface of sleeve 11 and is formed by a rigid bar 27.

FIG. 5 shows an adjustment device according to a second embodiment of the invention. This embodiment differs from FIGS. 1-4 in that spring 23 is received in a pocket 28 provided in sleeve 11 in front of pin teeth 15. In said pocket 28, also a separate spring-force applying member 26 is displaceably mounted. Spring 23 and member 26 are continuously held in front of pin gear 14, irrespectively of the instantaneous position of rod 10. This embodiment is especially intended to be used in such cases where gear rack 13 has a great length and/or when it is desired that rod 10 and sleeve 11 should be easily separable from each other.

The invention is not restricted to the embodiments above described and shown in the drawings. Thus, many other embodiments are feasible within the scope of the invention.

I claim:

1. A device for stepwise adjustment of the relative positions of two mutually displaceable members, said device comprising:
    a first opening defined by one of said members;
    a gear rack formed at one side of said first opening, said gear rack including a plurality of tooth gaps;
    a second opening defined in each of two sides of the other of said members;
    a pin gear mounted in each of said second openings and extending through said first opening, said pin gear having only two pin teeth cooperating with said gear rack, each of said two pin teeth being eccentrically mounted on said pin gear, said pin gear comprises a body, consisting of two portions being spaced apart opposite each other, securing means holding the two portions apart from one another form the two pin teeth of the pin gear, said pin gear including an operating means, having a gripping portion with two opposite gripping surfaces, each gripping surface located on one side of a plane through the axes of the two pin teeth, said pin gear being mounted in the other member to permit rotation thereof and to permit displacement thereof in a direction perpendicular to the longitudinal direction of the gear rack; and
  means for spring-biasing the pin gear towards a locking position in which said two members are held against relative displacement by said two pin teeth simultaneously engaging said gear rack when each of said two pin teeth are located in one of two adjacent tooth gaps of the gear rack, said spring biasing means being located in said first opening, and in front of said two pin teeth, on the opposite side thereof with respect to the gear rack, and said spring-biasing means including a spring-force applying member bearing resiliently against said two pin teeth when the pin gear is in its locking position.

2. A device according to claim 1, wherein said spring-force applying member extends substantially parallel to the gear rack along substantially the whole length thereof.

3. A device according to claim 1, wherein said first opening includes a pocket located in front of the pin teeth.

4. A device according to claim 1, wherein the spring-force applying member is formed by an at least substantially straight portion of a leaf spring which forms said spring-biasing means.

5. A device according to claim 1, wherein said one member is a flat rod and said other member is a flattened sleeve.

6. A device according to claim 1, wherein said two portions each define a cylindrical portion projecting into one of said second openings defined by the other member for journalling the pin gear in the second opening defined by the sides of the other member.

7. A device according to claim 6, wherein said two portions each include a radially projecting shoulder located adjacent to said cylindrical portion, said radially projecting shoulders bearing against the outer surface of the corresponding side of said other member.

* * * * *